(12) United States Patent
Hamm et al.

(10) Patent No.: US 9,405,282 B2
(45) Date of Patent: Aug. 2, 2016

(54) SAFETY-ORIENTED CONTROLLER IN COMBINATION WITH CLOUD COMPUTING

(71) Applicant: Siemens Aktiengesellschaft, Munich (DE)

(72) Inventors: Carsten Hamm, Erlangen (DE); Michael Kaever, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 691 days.

(21) Appl. No.: 13/713,831

(22) Filed: Dec. 13, 2012

(65) Prior Publication Data
US 2013/0158681 A1 Jun. 20, 2013

(30) Foreign Application Priority Data
Dec. 14, 2011 (EP) .................................... 11193445

(51) Int. Cl.
*G05B 9/02* (2006.01)
*H04L 12/50* (2006.01)
*G05B 15/02* (2006.01)
*G05B 19/042* (2006.01)

(52) U.S. Cl.
CPC ............ *G05B 15/02* (2013.01); *G05B 19/0428* (2013.01)

(58) Field of Classification Search
CPC ............ G05B 19/0428; G05B 19/048; G05B 19/0425; G05B 19/058; G05B 2219/14006; G05B 2219/14012; G05B 9/00; G05B 2219/1179; G05B 15/02
USPC ....................... 700/79; 370/395.52
See application file for complete search history.

(56) References Cited

U.S. PATENT DOCUMENTS

| | | | |
|---|---|---|---|
| 6,711,698 B1* | 3/2004 | Marbach et al. | 714/4.1 |
| 8,335,573 B2 | 12/2012 | Buettner et al. | |
| 2007/0276514 A1* | 11/2007 | Martinez | G05B 9/02 700/80 |
| 2010/0250813 A1* | 9/2010 | Barthel et al. | 710/301 |
| 2010/0280633 A1* | 11/2010 | Taschke et al. | 700/81 |

FOREIGN PATENT DOCUMENTS

| | | |
|---|---|---|
| CN | 1942839 | 4/2007 |
| CN | 102025582 | 4/2011 |
| DE | 10219501 | 11/2003 |

(Continued)

OTHER PUBLICATIONS

Akerberg et al.,Enabling Safety-CriticalWireless Communication usingWirelessHART and PROFIsafe,2010, IEEE, 8 pages.*

*Primary Examiner* — Robert Fennema
*Assistant Examiner* — Thomas Stevens
(74) *Attorney, Agent, or Firm* — Cozen O'Connor

(57) ABSTRACT

A control device cyclically accepts each safety-oriented input signal from an industrial-technical process in a fail-safe manner, and transfers the safety-oriented input signals to a Cloud using a fail-safe protocol over a link to a computer network. The control device also accepts signals from the Cloud over the link to the computer network, using the fail-safe protocol for the industrial-technical process specific safety-oriented control signals, and decides based on additional information in a fail-safe manner whether it recognizes the safety-oriented control signals determined by the Cloud for the industrial-technical process as correct. Depending on the result of the decision, the device controls the industrial-technical process in accordance with the safety-oriented control signals in a fail-safe manner or places the industrial-technical process into a safe state in a fail-safe manner.

8 Claims, 6 Drawing Sheets

(56) References Cited

FOREIGN PATENT DOCUMENTS

| | | | |
|---|---|---|---|
| DE | 10219501 | A1 | 11/2003 |
| EP | 2293164 | A1 | 3/2011 |
| EP | 2302472 | A2 | 3/2011 |
| EP | 2392434 | A2 | 12/2011 |
| WO | WO 2010121797 | | 10/2010 |

* cited by examiner

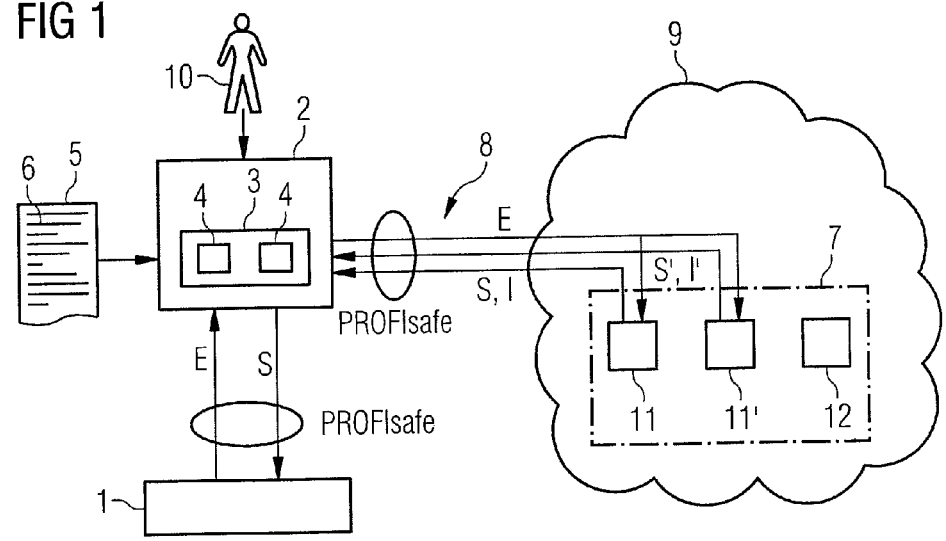
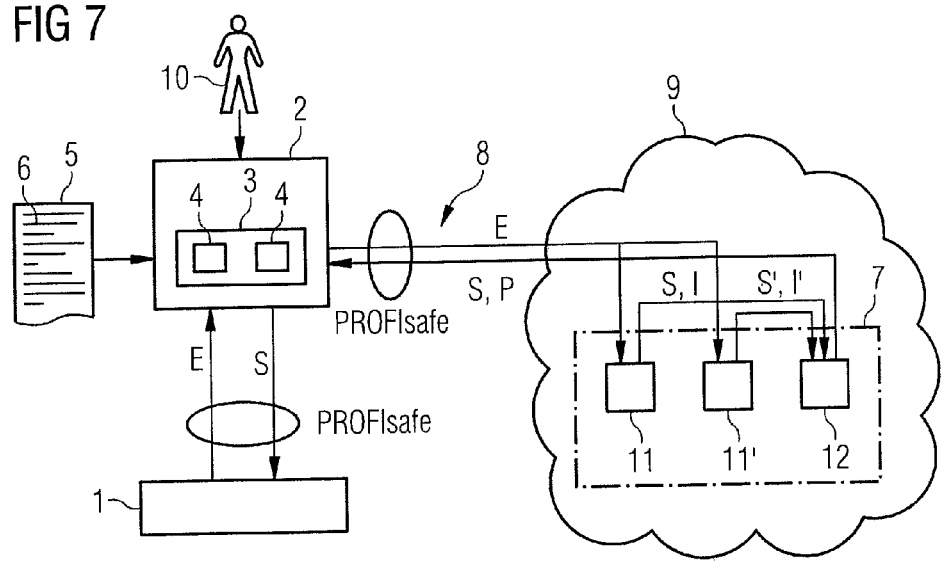

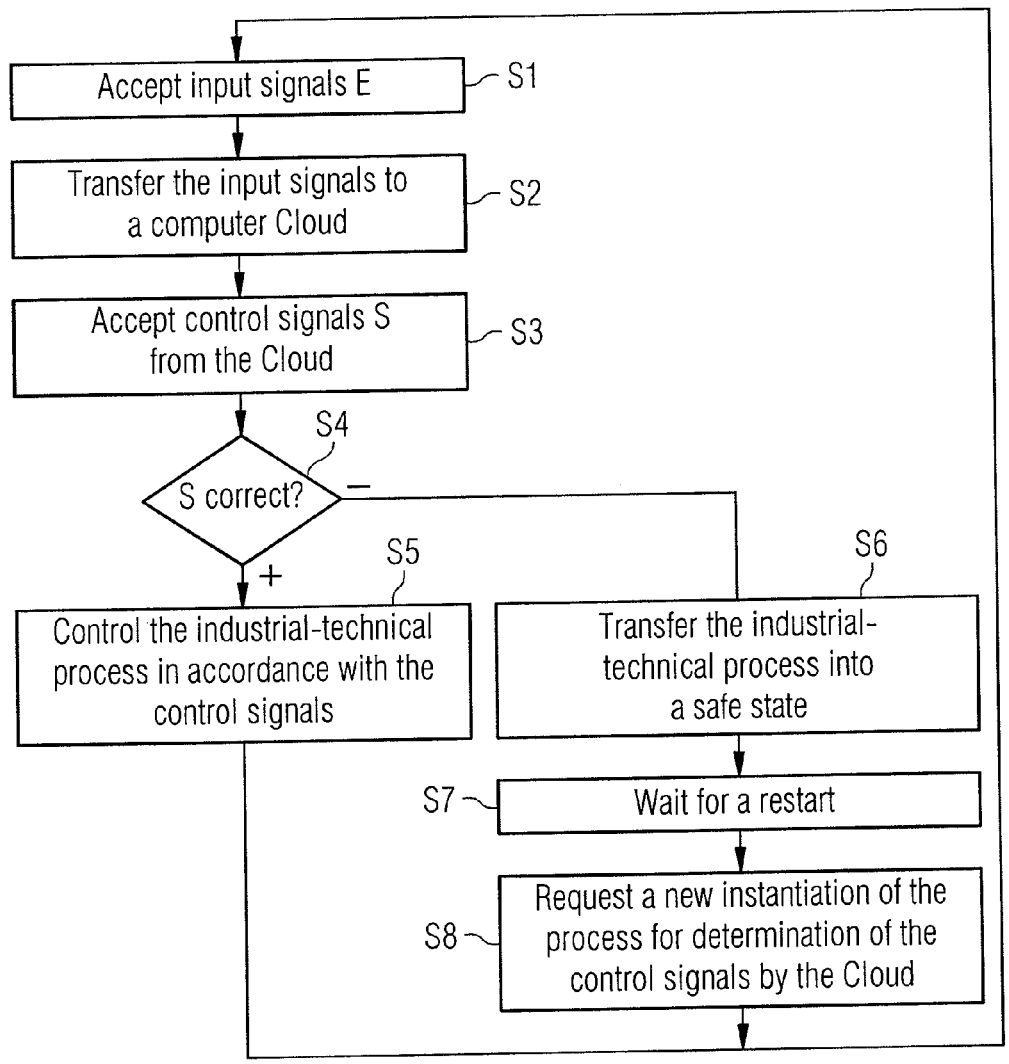

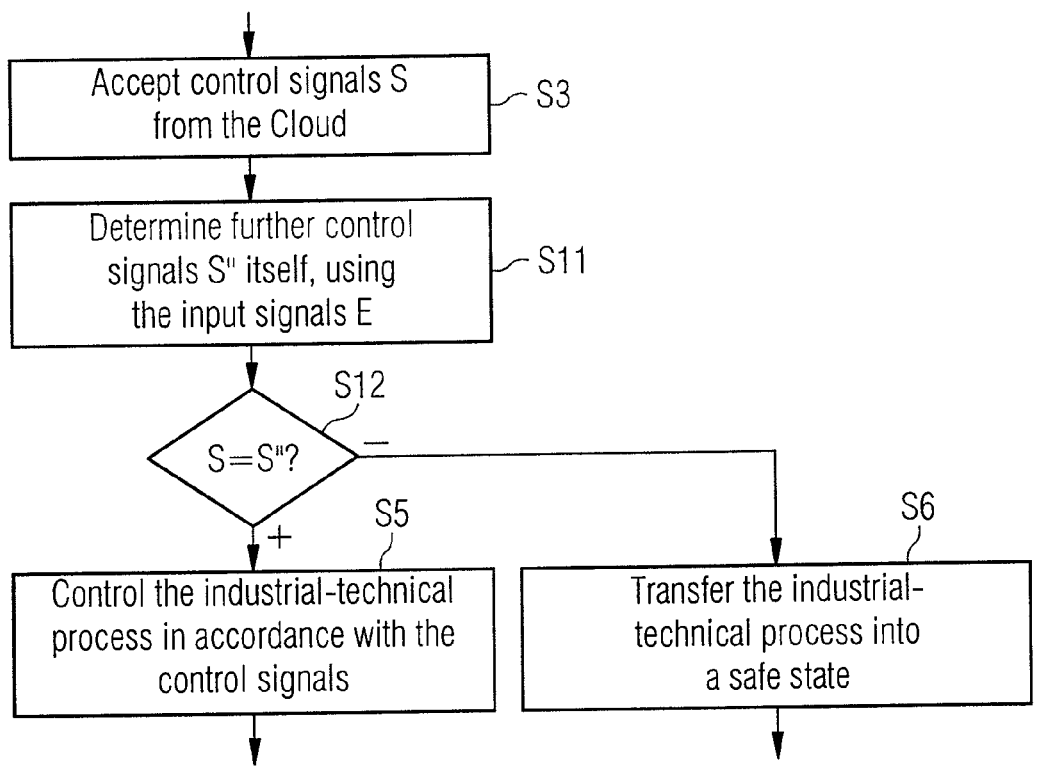

SAFETY-ORIENTED CONTROLLER IN COMBINATION WITH CLOUD COMPUTING

BACKGROUND OF THE INVENTION

1. Field of the Invention

The present invention relates to a method for operating a control device for an industrial-technical process.

The present invention further relates to a control program for a control device for an industrial-technical process, where the control program comprises machine code which is able to be processed directly by a processor device of the control device and the processing of which by the processor device causes the control device to implement such an operating method.

The present invention further relates to a control device for an industrial-technical process, where the control program comprises a processor device, where the control device is programmed with such a control program so that during operation, because of the processing of the machine code of the control program by the processor device, it performs such an operating method.

2. Description of the Related Art

Operating methods for control devices for an industrial-technical process are generally known. Often—but not exclusively—they are executed by programmable logic controllers. A programmable logic controller is thus a typical control device within the meaning of the present invention.

The conventional methods of operation for the control device generally executed by the control device accepting input signals from the process, the control device determining, using the input signals (and possibly further internal controller states such as timers and flags for example) specific control signals for the process, and the control device controlling the process in accordance with the control signals determined.

For many applications, this method of operation is sufficient. However, many safety-oriented applications also exist. In safety oriented applications an individual fault, regardless of the fault location, may not lead to the industrial-technical process getting into a dangerous state. Instead, the fault must be detected. In reaction to the fault, the process must be put into a safe state. A dangerous state within the meaning of the invention is a state in which the danger of damage to material or even personal injury occurs. A safe state of the present invention is a state in which such a danger does not exist. An example of a dangerous state is, for example, that an emergency-off switch becomes defective. In such a case, for example, an emergency shutdown could no longer be initiated by the emergency-off switch. A safe state is, for example, when the power to a plant is switched off.

The procedure for realizing such fail-safe behavior can be achieved in conventional systems by the control device accepting safety-oriented input signals from the process in a fail-safe manner, and the control device determining specific safety-oriented control signals in a fail-safe manner for the industrial-technical process.

In addition, a decision is performed (for example, as a result of a two-channel embodiment of the control devices), whether it recognizes the determined safety-oriented control signals as correct, and depending on the result of the decision, the control device either controls the industrial-technical process in accordance with the safety-oriented control signals in a fail-safe manner or it puts the industrial-technical process in a fail-safe manner into a safe state.

In conjunction with "normal", non-safety-oriented control processes, it is further known that the control device accepts input signals from the process, transfers the input signals to a computer via a link to a computer network, accepts specific control signals for the industrial-technical process from the computer via the link to the computer network and controls the industrial-technical process in accordance with the control signals accepted.

The topic of Cloud computing is currently revolutionizing data processing. The noticeable effect for users is an especially marked reduction in the response time in processor-intensive data processing tasks. However, questions also remain within the context of Cloud computing, such as redundancy and/or load distribution, and are supported by corresponding solutions. The focus is, however, rather directed to ensuring a desired level of performance (by distributing the load to different systems). Furthermore, reliability is dealt with within the meaning of fail-safe behavior or availability of the respective Cloud services. Server-specific standby functionality is thus involved.

It would be desirable to also employ Cloud computing in the area of safety-oriented control processes. For this purpose, the fail-safe input signals would have to be transferred via a fail-safe protocol to at least two computers, the control signals determined in each case by the respective computer and the comparison results with the control signals of the respective other computer or a corresponding enabling signal being accepted by both computers. Furthermore, a corresponding check of the accepted control signals would have to be made. However, this is not readily possible. This is because, within the framework of Cloud computing, virtual mapping of the desired processing request—undetectable for the user—to a computer of a computer network occurs. The mapping occurs hidden to the user. Therefore, it cannot be readily guaranteed that the control signals will be determined on physically separated computers. Instead, the situation can occur that the determination of the control signals occurs on two logical computers that are realized physically by the same computer. In such cases, an error in the one physical computer that realizes both logical computers would no longer be able to be detected, so that a dangerous situation can arise unnoticed.

SUMMARY OF THE INVENTION

It is therefore an object of the present invention to create options by which Cloud computing can also be used for safety-oriented applications.

This and other objects and advantages are achieved by providing a method in which each control device cyclically accepts safety-oriented input signals from the industrial-technical process in a fail-safe manner, transfers the safety-oriented input signals using a fail-safe protocol to a computer via a link to a computer network, accepts specific safety-oriented control signals from the computer via the link to the computer network using the fail-safe protocol for the industrial-technical process, based on additional information, decides in a fail-safe manner whether it recognizes the safety-oriented control signals determined by the computer intended for the industrial-technical process as correct, and depending on the results of the decision, either controls the industrial-technical process in accordance with the safety-oriented control signals in a fail-safe manner or puts the industrial-technical process into a safe state in a fail-safe manner.

The effect of transferring the input signals using the fail-safe protocol is that, on the computer side, mistransmissions and signal errors or other manipulations are able to be detected. The Cloud can react accordingly, for example, the Cloud in such cases can direct a request for a new transfer of the input signals to the control device. As an alternative, the Cloud—depending on the situation of the individual case—can determine the control signals such that the industrial-technical process is put into a safe state.

The effect of transferring the control signals using the fail-safe protocol is that, on the control device side, mistransmissions and signal errors or other manipulations of the control signals are able to be detected. The control device is thus in a position to react accordingly if necessary. For example, the control device in such cases can send a request to the Cloud for a retransmission of the control signals or can put the industrial-technical process into a safe state.

The decisive factor, however, is the presence of the additional information. This is because the additional information makes it possible for the control device to decide whether to recognize the safety-oriented control signals determined by the Cloud intended for the industrial-technical process as correct or not. This is because the previously missing link in the chain, i.e., the checking of the determination of the control signals, is only realized in this way.

There are various options for making the additional information available. As a rule the additional information is made available by the Cloud over the computer network. However, it is likewise possible for the control device to determine the additional information itself.

The latter case, i.e., that the control device determines the additional information itself, is generally configured such that the control device itself, using the safety-oriented input signals accepted in a fail-safe manner from the industrial-technical process, determines further safety-oriented control signals intended for the industrial-technical process, the additional information comprises the further safety-oriented control signals determined by the control device itself and the check for correctness of the safety-oriented control signals transferred from the Cloud to the control device includes a comparison of the safety-oriented control signals transferred to the control device with the further safety-oriented control signals determined by the control device itself.

When both the Cloud and also the control device are operating correctly, the further control signals determined by the control device are identical in content with the control signals determined by the Cloud. Thus, a safe comparison of identity merely has to be implemented on the control device side. This can be readily and simply realized.

If the additional information of the control device is made available by the Cloud over the computer network, it is possible, for example, for the control device to accept via the link to the computer network from the Cloud, using the fail-safe protocol, in addition to the safety-oriented control signals intended for the industrial-technical process—especially together with the safety-oriented control signals intended for the industrial-technical process—a signature uniquely identifying a computing path of the Cloud. It is also possible for the control device to transfer the safety-oriented input signals to the Cloud once again, using the fail-safe protocol, via the link to the computer network, for the control device to accept, using the fail-safe protocol, via the link to the computer network by the Cloud, for further safety-oriented control signals intended for the industrial-technical process especially together with further safety-oriented control signals intended for the industrial-technical process in particular together with the further safety-oriented control signals intended for the industrial-technical process, a further signature uniquely identifying a further computing path of the Cloud, for the additional information to include the further safety-oriented control signals determined on the further computing path and the signatures of the computing paths, and for the check for correctness of the safety-oriented control signal transferred from the Cloud to the control device to include a comparison between the safety-oriented control signals accepted by the Cloud and a comparison between the signatures accepted by the Cloud.

In this case, it can be determined by comparing the signatures whether the control signals, for example, have been determined from physically different computers and/or by different algorithms—key word "coded processing" or "diversity programming". The comparison between the control signals themselves can be directed to content identity.

It is even possible to perform the comparison of the control signals within the Cloud and to transfer the results of the comparison to the control device. In this case, provision is thus made, for the control device to transfer the safety-oriented input signals to the Cloud one further time using the fail-safe protocol over the link to the computer network, for the control device to accept, in addition to the safety-oriented control signals intended for the industrial-technical process—especially together with the safety-oriented control signals intended for the industrial-technical process—test information, using the fail-safe protocol, over the link to the computer network, for the additional information to comprise the test information, and for the check for correctness of the safety-oriented control signals transferred to the control device to include a check of the test information as to a match with required test information.

In this case, the Cloud must include a safe comparator that performs the check of the control signals for identity and the computing paths for non-identity. The safe comparator adds the test information to the control signals, for example, an electronic test seal or an electronic certificate. The information is naturally only added if the control signals have been correctly transferred by the computers and the computing paths are different from one another. In this case, the control device must thus only check that the test information matches required test information. Here, the appropriate mode of operation of the comparator must be guaranteed on the Cloud side.

It is also an object of the invention to provide a control program with the processing of the machine code by the processor device causing the control device to execute an operating method in accordance with the invention.

It is also another object to provide a control device for an industrial-technical device, where the control device is programmed with the control program in accordance with the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The properties, features and advantages of the present invention described above, as well as the manner in which these are achieved, will be explained in a clearer and more comprehensible manner in conjunction with the description of exemplary embodiments given below, which is explained in greater detail in conjunction with the drawings, in which:

FIG. 1 shows a control arrangement in accordance with an embodiment of the invention;

FIGS. 2 to 6 show flowcharts of the method in accordance with the invention; and FIG. 7 shows a further control arrangement in accordance with an embodiment of the invention.

DETAILED DESCRIPTION OF THE PREFERRED EMBODIMENTS

Figure 4:
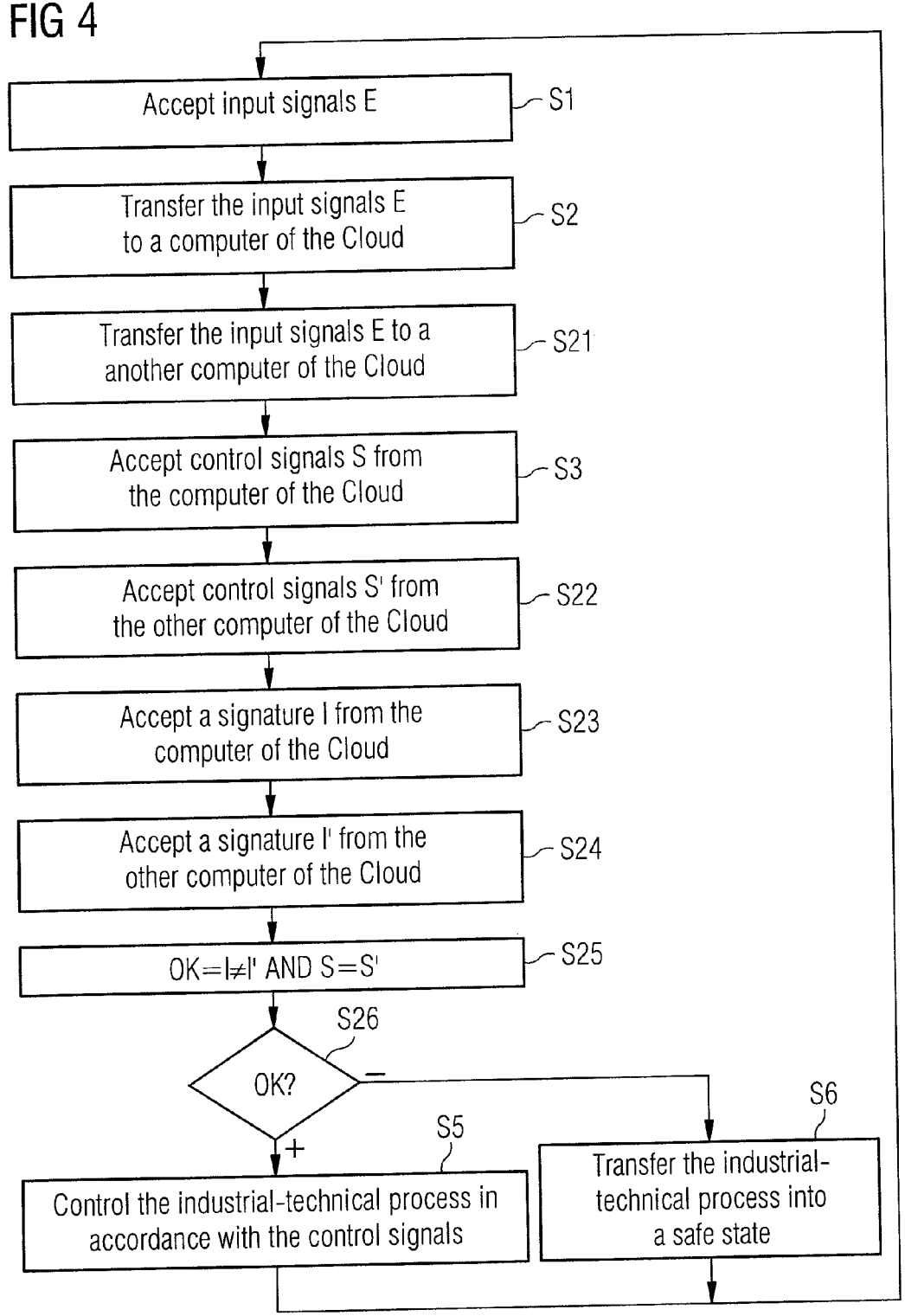

In accordance with FIG. 1, an industrial-technical process 1 is controlled by a control device 2. The industrial-technical process 1 can involve any given process, for example, a burner control, a press control, a chemical plant, a bottling plant, or an elevator. Regardless of the type of industrial-technical process, the industrial-technical process must, however, be safely controlled by the control device 2.

The control device 2 comprises a processor device 3. The processor device 3 comprises at least one processor 4. Often the processor device 3 comprises a number of processors 4, which can check each other. "Safe" in this regard is to be understood in the sense of "fail-safe". It must thus be guaranteed that an individual fault cannot lead to an unnoticed dangerous state of the industrial-technical process 1. For example, input signals E must thus be detected a number of times by corresponding sensors and forwarded to the control device 2. In the control device 2, there must be safe data processing and safe checking of the results that is determined, so that even an individual fault in the control device 2 can be detected. Furthermore, control signals S must be output in a fail-safe manner to the industrial-technical process 1. The control signals S are therefore output redundantly to a number of actuators. Putting the process into the safe state is undertaken if one of the actors reacts accordingly. For example, a number of contactors connected in series are generally provided for this purpose if the industrial-technical process 1 is to be disconnected safely from an electrical power supply.

The control device 2 is programmed with a control program 5. The control program 5 comprises machine code 6, which is able to be processed directly by the processor device 3. The processing of the machine code 6 by the processor device 3 causes the control device 2 to perform an operating method which will be explained in greater detail below in conjunction with FIG. 2. FIG. 1 is always to be included as well in this context and also in connection with the explanation of FIGS. 3 to 5.

In accordance with FIG. 2, in a step S1, the control device 2 accepts the input signals E from the industrial-technical process 1. The input signals E involve safety-oriented input signals. They are accepted by the control device 2 in a fail-safe manner. For example, the input signals E can be transferred in accordance with the diagram shown in FIG. 1 according to a PROFIsafe protocol from sensors (not shown in FIG. 1) to the control device 2. "PROFIsafe" is a standardized protocol for safe data transfer, see for example International Electrotechnical Commission (IEC) standard 61 784-3-3.

In a step S2, the control device 2 transfers the safety-oriented input signals E to a Cloud 7. The transfer is undertaken in accordance with FIG. 1 via a link 8 to a computer network 9. The computer network 9 can, for example, be a Local Area Network (LAN). As an alternative, it can involve a Wide Area Network (WAN) or the World Wide Web (WWW). The signals are transferred via a fail-safe protocol, for example, the PROFIsafe protocol already mentioned or https.

The task of the Cloud 7, using the input signals E of the industrial-technical process 1 and any further states, for example, of timers and/or flags of the Cloud 7 is to determine control signals S for the industrial-technical process 1, i.e., the control signals S intended for the industrial-technical process 1. The Cloud 7 transfers the control signals S determine by it to the control device 2. The control signals S are transferred on the same path and in the same manner as the input signals E, i.e., via the link 8 of the control device 2 to the computer network 9 and using the safe protocol. The control device 2 accepts the control signals S from the Cloud 7 in a step S3.

The control signals S, in a similar manner to the input signals E, must be safety-oriented. The control signals S must therefore be recognized by the control device 2 as correct. Any errors in the transfer can be detected by the control device 2 as a result of using the safe protocol. The check for correct determination of the control signals S must, however, be performed by the control device 2 based on additional information S''; S', I, I'; P. The control device 2 performs this check in a step S4 in a fail-safe manner. Depending on the results of the check, the control device 2 either performs a step S5 or a step S6.

If the control signals S, are recognized by the control device 2 as being correct, the control device 2, in step S5, controls the industrial-technical process 1 in accordance with the safety-oriented control signals S in a fail-safe manner. If the control signals S are not recognized as being correct by the control device 2, the control device 2 puts the industrial-technical process 1 in step S6 into a safe state in a fail-safe manner.

It is possible for there also to be a step S7. In step S7 the control device 2 waits, if necessary, for a new start of the sequence described above. The new start can especially require an action by an operator 10, for example, the actuation of the reset button. As an alternative, the step S7 can be omitted. In this case the control device 2 resumes normal operation (in which step S5 is executed) by itself, as soon as it recognizes the control signals S transferred from the Cloud 7 as correct again.

As an alternative or in addition to step S7, there can also be a step S8. If step S8 is present, the control device 2 requests, in step S8, a new instantiation of the (computing) process for determination of the control signals S by the Cloud 7. This new instantiation can, for example, at random or explicitly, result in a different computer 11' of the Cloud 7 than previously being tasked with the determination of the control signals S.

It is especially evident from the above-remarks that the control device 2 executes these steps S1 to S6 (and if necessary also the steps S7 and/or S8) cyclically. In particular, normal operation (if, i.e., step S5 is executed) is executed several times per second, mostly 20× to 100× per second. The same applies if the step S7 and/or the step S8 are not present and special operation is executed, i.e., there is a jump from step S4 to step S6.

There are various options for the implementation of step S4. For example, in accordance with FIG. 3, step S4 can be implemented in the form of steps S11 and S12.

In step S11, the control device 2 determines further safety-oriented control signals S'' itself. The further control signals S'' are likewise intended for the industrial-technical process 1. The further control signals S'' correspond in the normal case, i.e., when both the Cloud 7 and also the control device 2 are functioning correctly, 1:1 in terms of content to the control signals S determined by the Cloud 7. The control device 2 thus determines the further control signals S'', like the Cloud 7, using the safety-oriented input signals E, which the control device 2 has accepted from the industrial-technical process in a fail-safe manner. If necessary, the control device 2, within the framework of determining the further control signals S", (like the Cloud 7) uses further states, for example, the states of timers and/or flags within the control device.

In step S12, the control device 2 compares the control signals S determined by the Cloud 7 in a fail-safe manner with the further control signals S" determined by the control device 2. The control device 2 recognizes the control signals S determined by the Cloud 7 as correct if they match the further control signals S" determined by the control device 2.

The additional information S", S', I, I'; P comprises, within the framework of the method of operation of FIG. 3, the further control signals S" determined in step S11. In particular, the additional information S"; S', I, I'; P can be identical to the further control signals S" determined in step S11.

The method of operation of FIG. 3 is especially advantageous if, within the meaning of diversity programming—often also referred to as "coded processing"—the control signals S are determined by the Cloud 7 by means of an algorithm that is different from the algorithm with which the control device 2 determines the further control signals S". In this case, the more computing-intensive algorithm (which is generally significantly more computing-intensive) in particular is executed by the Cloud 7.

As an alternative to the method of operation of FIG. 3, it is possible to proceed as shown in FIG. 4. In accordance with FIG. 4, step S4 of FIG. 2 is implemented in the form of steps S21 to S26. Within the framework of step S2, which is likewise present in FIG. 4, the input signals E are transferred by the control device 2 to any given computer 11 of the Cloud 7.

In step S21, the control device 2 likewise transfers the safety-oriented input signals E to a computer 11' of the Cloud 7 (see FIG. 1). As regards content, step S21 thus corresponds to step S2. S21 differs from step S2, however, in that the transfer in step S21 is to a different physical computer 11' than is the case in step S2. The computer 11' of step S21 is thus not physically identical to the computer 11 of step S2.

The further computer 11' determines, as the control device 2 previously did in FIG. 3, the further control signals S'. The further computer 11' transfers the further control signals S' transferred by it to the control device 2. The control device 2 accepts the further control signals S' in step S22. Step S22 thus corresponds in terms of content to step S3. The step differs from step S3, in a manner similar to the difference between steps S2 and S21, in that the transfer of the further control signals S' originates from the further computer 11', and not from the computer 11 of step S3.

In steps S23 and S24, the control device 2 accepts a signature I, I' from computer 11 in each case. The respective signature I, I' uniquely identifies the respective computer 11, 11' of the Cloud 7. The transfer of signatures I, I' is undertaken in the same way as the transfer of the control signals S, S', i.e., via the link 8 between the control device 2 and the computer network 9, by the respective computer 11, 11' and using the fail-safe protocol.

In step S25, the control device 2 determines in a fail-safe manner the value of a logical variable OK. The logical variable OK assumes the value TRUE if and only if the signatures I, I' of the computers 11, 11' do not match one another, and the control signals S and the further control signals S' match one another.

In step S26 the control device 2 checks the value of the logical variable OK.

Within the context of the method of operation of FIG. 4, the additional information S"; S', I, I'; P thus comprises the signatures I, I' of the computers 11, 11' and the control signals S' determined by the further computer 11'. In particular, the additional information S"; S', I, I'; P with the signatures I, I' and the further control signals S' can be identical. The checking for correctness of the control signals S comprises a comparison of the signatures I, I' with one another and a comparison of the control signals S, S' determined by the computers 11, 11' with one another.

The determination of the further control signals S' on a further computer 11', which is a physically different computer 11' from the computer 11, corresponds to a further computing path within the scope of the present invention. As an alternative or in addition, it is possible to determine the further control signals S' by means of another algorithm—keyword once more "coded processing". This method of operation too corresponds to a further computing path within the scope of the present invention.

Figure 5:
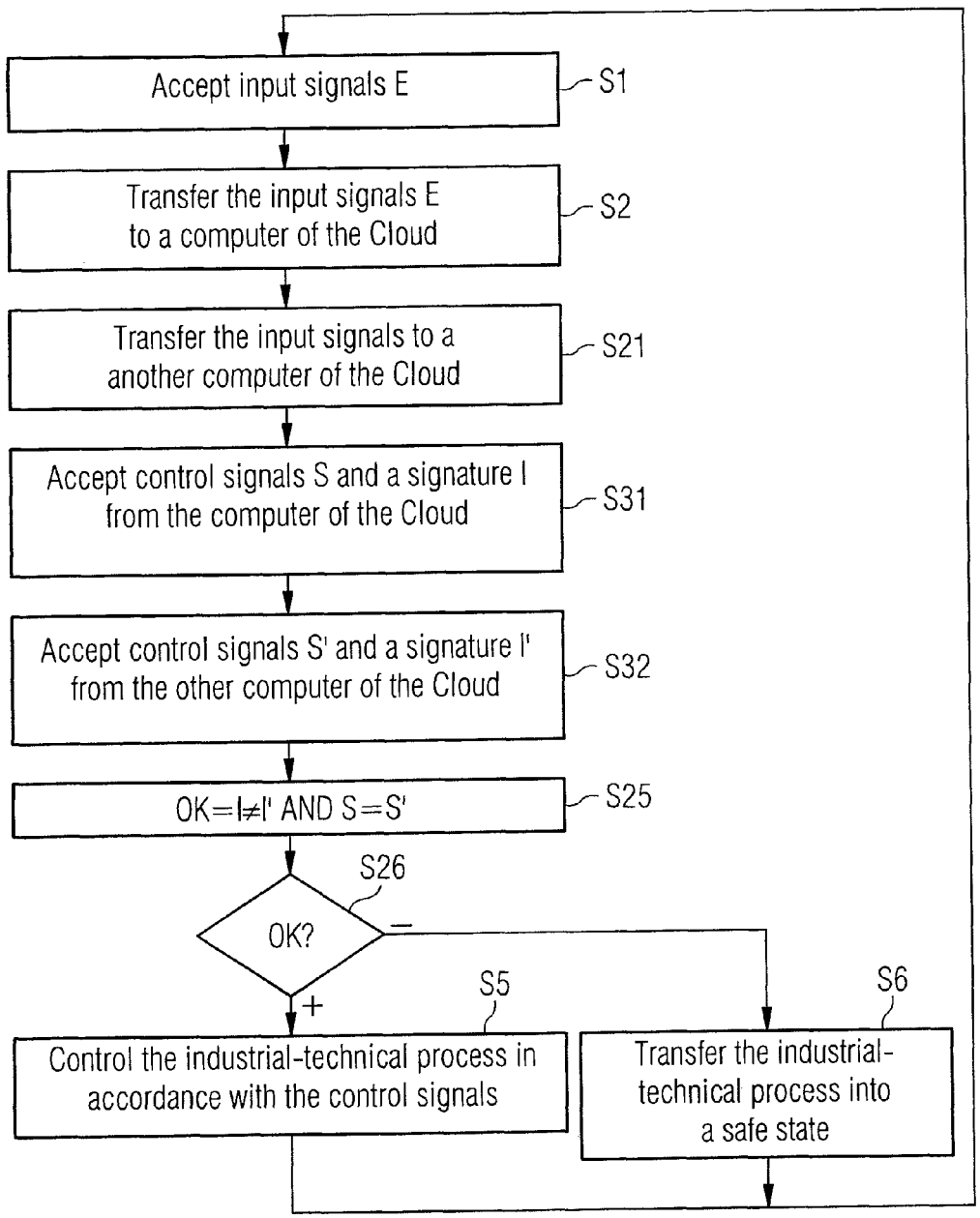

The method of operation of FIG. 5 essentially corresponds to that of FIG. 4. The difference is that steps S3, S22, S23 and S24 are replaced by steps S31 and S32. Step S31 corresponds to the combination of steps S3 and S23. Step S32 corresponds to the combination of steps S22 and S24. In the method of operation of FIG. 5, the respective signature I, I' is thus transferred from the respective computer 11, 11' together with the respective control signals S, S' to the control device 2 and is accepted by the control device 2.

Figure 6:
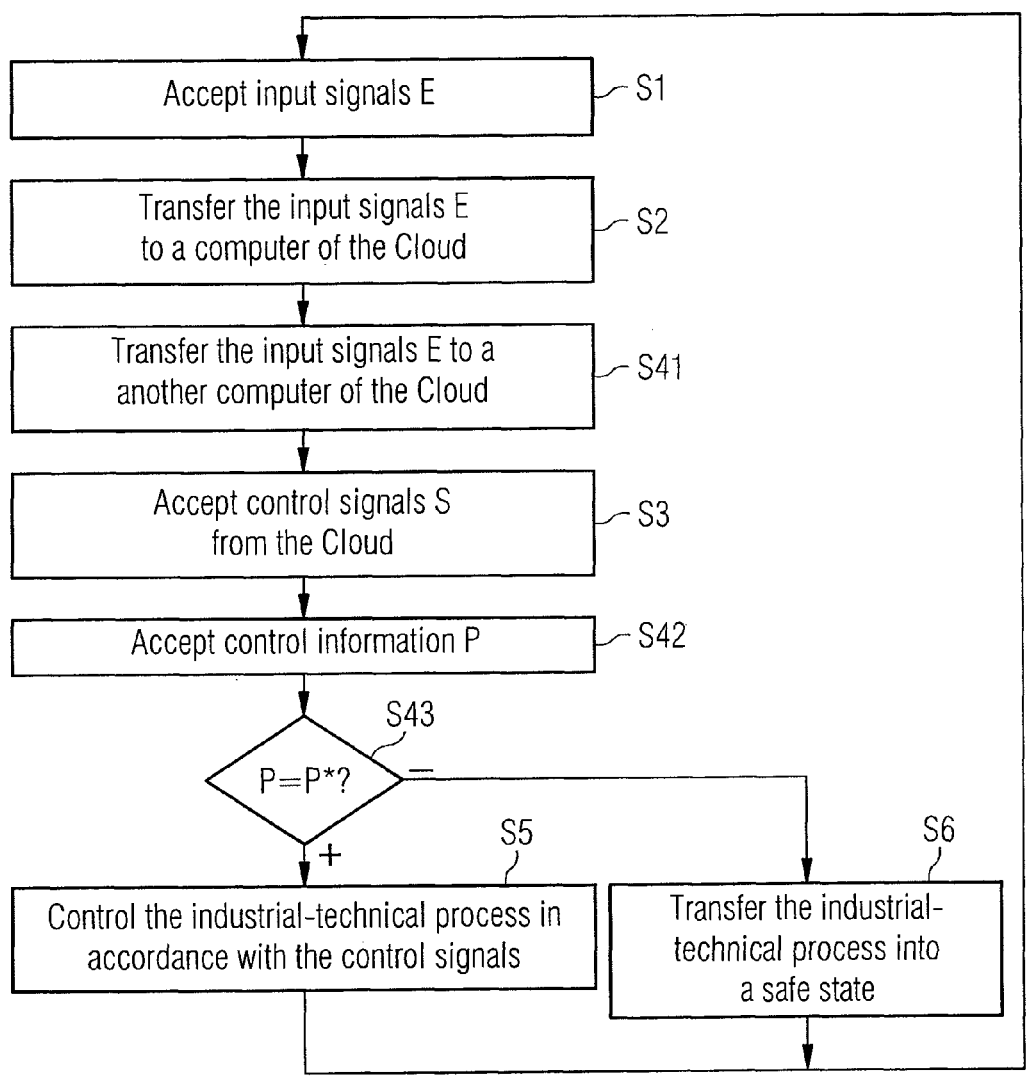

As an alternative to the methods of operation of FIGS. 3, 4 and 5, it is possible to proceed as shown in FIG. 6. FIG. 6 is explained below in conjunction with FIG. 7. Although FIG. 7 essentially shows the same control arrangement as FIG. 1, it shows a different data flow. The information is presented in a separate figure in order not to over complicate FIG. 1.

In accordance with FIG. 6, step S4 of FIG. 2 is realized in the form of steps S41 to S43.

In step S41, the control device 2, similarly to step S21 of FIG. 4, transfers the safety-oriented input signals E a further time to the Cloud 7. They are accepted by the further computer 11' of the Cloud 7.

The computers 11, 11' determine the respective control signals S, S' determined by them and also their respective signature I, I' at a safe comparator 12. The safe comparator 12, like the computers 11, 11', is a component of the Cloud 7. It can be realized within the Cloud 7 as a self-contained structure. As an alternative, the safe comparator 12 can be realized in one or, preferably, both of the computers 11, 11'. The safe comparator 12 performs a safe comparison of the safety-oriented control signals S, S' and the signatures I, I'. In terms of content, the functionality of the safe comparator 12 corresponds to steps S25 and S26 of FIG. 4.

The effect of the comparison is that the control signals S are transferred to the control device 2, so that the control device 2 can accept the control signals S in step S3. The signals can be transferred to the control device 2, for example, by the safe comparator 12 transferring the control signals S to the control device 2 itself. As an alternative, the safe comparator 12 can transfer a corresponding enabling signal to one of the computers 11, 11'.

In addition, the safe comparator 12 transfers test information P to the control device 2. The control device 2 accepts the test information P in step S42. The test information P is characteristic of the control signals S, S' having been correctly determined by computers 11, 11'. For example, an electronic signature or an electronic test certificate can be involved.

The test information P is transferred to the control device 2 in the same way as the transfer of the control signals S, S', i.e., over the link 8 between the control device 2 and the computer network 9, from the Cloud 7 (more precisely: from the comparator 12 of the Cloud 7) and using the fail-safe protocol. The information can, similarly to steps S31 and S32 of FIG. 5, be transferred together with the control signals S.

In step S43, the control device 2 compares the transferred test information P in a fail-safe manner for a match with required test information P*. In particular, the control device 2 can analyze the test information P for this purpose. A comparison with the transferred control signals S is also possible. In this case, the required test information P* is dependent on the transferred control signals S. As an alternative, the required test information P* can be independent of the transferred control signals.

Within the context of the method of operation of FIG. 6, the additional information S"; S', I, I'; P thus includes the test information P. In particular, it can be identical to the test information.

The embodiment of the principle of FIG. 2 in accordance with the actual methods of operation of FIG. 3, of FIG. 4 and FIG. 5 as well as FIG. 6 can be realized individually. As an alternative, it is possible to combine each of these methods with one another. This can be especially advantageous to achieve an even higher degree of safety or a higher level of redundancy (for example, within the sense of a two-of-three logic).

The object achieved by the disclosed embodiments of the invention is that safety-oriented control functions can also be achieved by the infrastructure of Cloud computing. Thus, the (almost) unlimited resources of the Cloud are statically or dynamically also available for safety-oriented control functions. The solution of complex control tasks by a relatively low-power control device 2 is thus also possible, because the computer-intensive tasks are relocated into the Cloud. Despite this, it is still guaranteed in a simple manner that a failure of the elements 11, 11', 12 involved of the Cloud 7 can be detected and the fallback into the safe state is possible. The whole chain, calculated from the detection of the input signals E to the output of the control signals S to the industrial-technical process 1, remains safeguarded. In particular, it can be recognized when an intentionally redundant process is ultimately only occurring in virtual different computers which are physically realized by the same computer 11 or 11' of the Cloud 7 or is occurring without diversity programming.

Although the invention has been illustrated and described in greater detail by the preferred exemplary embodiment, the invention is not restricted by the disclosed examples and other variants can be derived herefrom by the person skilled in the art without departing from the scope of the invention.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An operating method for a control device for an industrial-technical process, the method comprising cyclical steps of:
   accepting, by the control device, input signals indicating safe-operation from the industrial-technical process in a fail-safe manner;
   transferring, by the control device, the input signals indicating safe-operation of the industrial-technical process to a Cloud using a fail-safe protocol over a link to a computer network;
   receiving, by the control device, specific control signals indicating safe-operation from the Cloud using the fail-safe protocol for the industrial-technical process via the link to the computer network;
   deciding, by the control device, based on additional information in a fail-safe manner, whether the control signals indicating safe-operation determined by the Cloud intended for the industrial-technical process are recognized as safe; and
   depending on results of the decision, one of controlling the industrial-technical process in accordance with the control signals indicating safe-operation in the fail-safe manner and placing the industrial-technical process into a safe state in the fail-safe manner to prevent an occurrence of damage to material or to prevent personal injury;
   wherein the control device, using the fail-safe protocol, accepts from the Cloud over the link to the computer network, in addition to the control signals indicating safe-operation intended for the industrial-technical process, a signature uniquely identifying a computing path of the Cloud;
   wherein the control device transfers safety-oriented input signals indicating safe-operation a further time to the Cloud using the fail-safe protocol via the link to the computer network;
   wherein the control device accepts further control signals indicating safe-operation intended for the industrial-technical process from the Cloud over the link to the computer network, using the fail-safe protocol, and accepts a further signature uniquely identifying a computing path of the Cloud;
   wherein the additional information comprises further control signals indicating safe-operation accepted from the Cloud and the signatures of the computing path; and
   wherein a check for correctness of the control signals indicating safe-operation transferred from the Cloud to the control device comprises the step of comparing the control signals indicating safe-operation accepted from the Cloud with a comparison between the signatures accepted from the Cloud.

2. The operating method as claimed in claim 1, further comprising:
   determining, by the control device, further control signals indicating safe-operation intended for the industrial-technical process, using the input signals indicating safe-operation accepted in a fail-safe manner from the industrial-technical process;
   wherein the additional information comprises the further control signals indicating safe-operation determined by the control device; and
   wherein the check for correctness of the control signals indicating safe-operation transferred from the Cloud to the control device further comprises the step of comparing the control signals indicating safe-operation transferred to the control device with the further control signals indicating safe-operation determined by the control device itself.

3. The operating method as claimed in claim 1, wherein the control device transfers the input signals indicating safe-operation a further time to the Cloud using the fail-safe protocol via the link to the computer network;
   wherein the control device accepts, using the fail-safe protocol, over the link to the computer network, in addition to the control signals indicating safe-operation intended for the industrial-technical process, test information;
   wherein the additional information comprises the test information; and
   wherein the check for correctness of the control signals indicating safe-operation transferred to the control device further comprises the step of performing a check on the test information for a match with required test information.

4. The operating method as claimed in claim 3, wherein the control device accepts, in addition to the control signals indicating safe-operation intended for the industrial-technical process, the test information.

5. The operating method as claimed in claim 1, wherein the control device accepts the control signals indicating safe-operation intended for the industrial-technical process with the signature uniquely identifying a computing path of the Cloud.

6. The operating method as claimed in claim 1, wherein the control device accepts the further control signals indicating safe-operation intended for the industrial-technical process and the further signature uniquely identifying the computing path of the Cloud.

7. A control device for an industrial-technical process, comprising:
   a processor device;
   wherein the control device is configured to:
      accept input signals indicating safe-operation from the industrial-technical process in a fail-safe manner;
      transfer the input signals indicating safe-operation of the industrial-technical process to a Cloud using a fail-safe protocol over a link to a computer network;
      receive specific control signals indicating safe-operation from the Cloud using the fail-safe protocol for the industrial-technical process via the link to the computer network;
      decide, based on additional information in a fail-safe manner, whether the control signals indicating safe-operation determined by the Cloud intended for the industrial-technical process are recognized as safe; and
      depending on results of the decision, one of control the industrial-technical process in accordance with the control signals indicating safe-operation in the fail-safe manner and place the industrial-technical process into a safe state in the fail-safe manner to prevent the occurrence of damage to material or to prevent personal injury.

8. An operating method for a control device for an industrial-technical process, the method comprising cyclical steps of:
   accepting, by the control device, input signals indicating safe-operation from the industrial-technical process in a fail-safe manner;
   transferring, by the control device, the input signals indicating safe-operation of the industrial-technical process to a Cloud using a fail-safe protocol over a link to a computer network;
   receiving, by the control device, specific control signals indicating safe-operation from the Cloud using the fail-safe protocol for the industrial-technical process via the link to the computer network;
   deciding, by the control device, based on additional information in a fail-safe manner, whether the control signals indicating safe-operation determined by the Cloud intended for the industrial-technical process are recognized as safe; and
   depending on results of the decision, one of controlling the industrial-technical process in accordance with the control signals indicating safe-operation in the fail-safe manner and placing the industrial-technical process into a safe state in the fail-safe manner to prevent an occurrence of damage to material or to prevent personal injury;
   wherein the control device transfers the input signals indicating safe-operation a further time to the Cloud using the fail-safe protocol via the link to the computer network;
   wherein the control device accepts, using the fail-safe protocol, over the link to the computer network, in addition to the control signals indicating safe-operation intended for the industrial-technical process, test information;
   wherein the additional information comprises the test information; and
   wherein a check for correctness of the control signals indicating safe-operation transferred to the control device comprises the step of performing a check on the test information for a match with required test information.

* * * * *